United States Patent [19]

Allen et al.

[11] Patent Number: 5,111,965
[45] Date of Patent: May 12, 1992

[54] APPARATUS FOR FEEDING PIPETTE TIPS

[75] Inventors: Terry W. Allen; James J. Pioch, both of Rochester, N.Y.

[73] Assignee: Eastman Kodak Company, Rochester, N.Y.

[21] Appl. No.: 576,878

[22] Filed: Sep. 4, 1990

[51] Int. Cl.[5] ............................................... B65G 59/00
[52] U.S. Cl. .................................. 221/281; 221/290; 221/294; 221/298; 221/299
[58] Field of Search ............. 221/281, 289, 290, 294, 221/297-299, 301, 156, 171; 414/795.6; 193/44, 47; 198/398, 406

[56] References Cited

U.S. PATENT DOCUMENTS

| | | | |
|---|---|---|---|
| 3,840,149 | 10/1974 | Zeller | 221/289 |
| 3,842,533 | 10/1974 | Mayer | 221/298 |
| 3,843,323 | 10/1974 | Quame | 23/230 |
| 4,341,325 | 7/1982 | Lowdermilk | 221/297 |

FOREIGN PATENT DOCUMENTS

| | | | |
|---|---|---|---|
| 2611465 | 9/1988 | France | 221/297 |
| 60-122373 | 6/1985 | Japan | |
| 0167113 | 6/1989 | Japan | 193/44 |

*Primary Examiner*—David H. Bollinger
*Attorney, Agent, or Firm*—Dressler, Goldsmith, Shore, Sutker & Milnamow

[57] ABSTRACT

An apparatus for automatically feeding pipette tips is disclosed. The apparatus includes a carrier for receiving the pipette tips, one at a time, and for presenting the tips to the pipette of an associated apparatus, such as a blood analyzer. The apparatus further includes a generally elongated feed magazine for gravity-feed of the pipette tips to the carrier. Notably, the feed magazine includes an angled, generally funnel-like entrance portion which prevents insertion of the pipette tips into the magazine in an incorrect orientation, while permitting the tips to be inserted in the correct orientation.

9 Claims, 2 Drawing Sheets

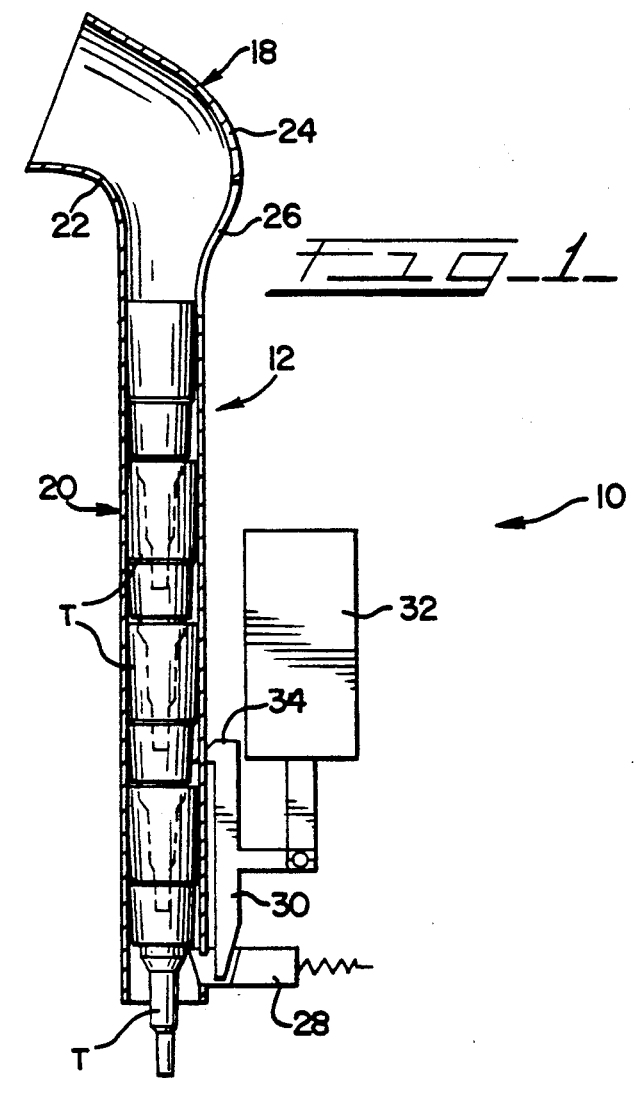
FIG_1

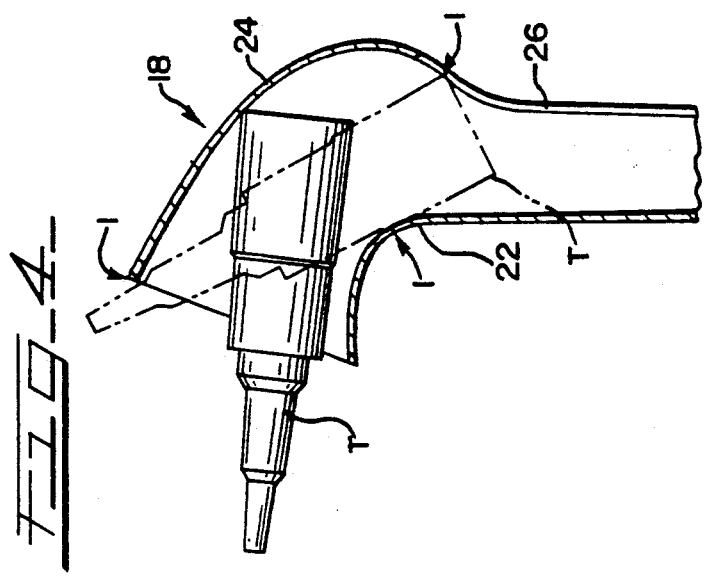
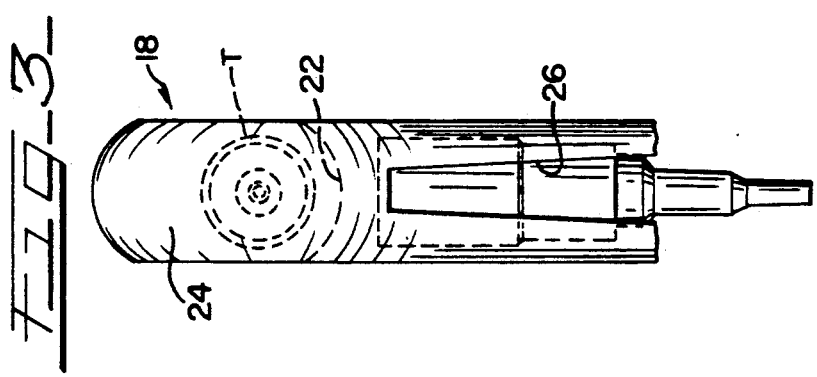
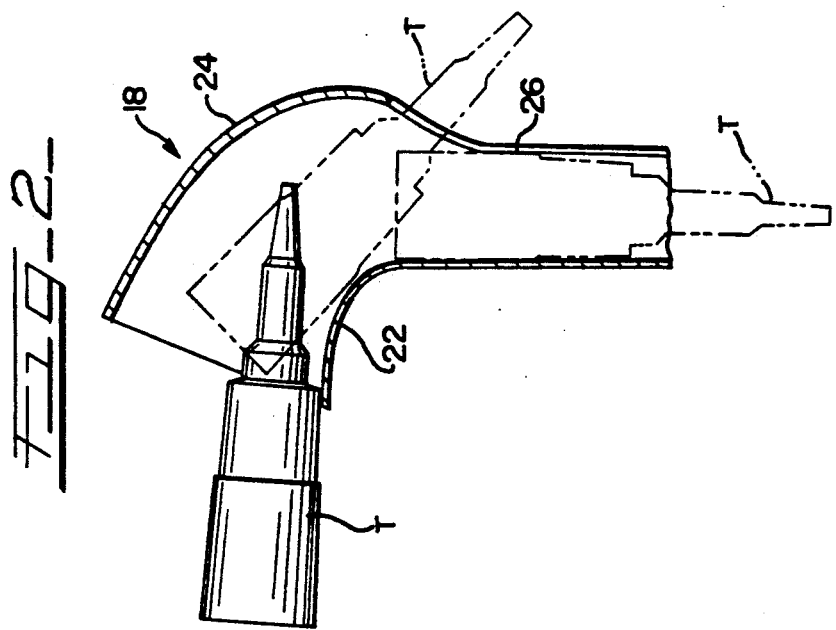

APPARATUS FOR FEEDING PIPETTE TIPS

Technical Field

The present invention relates generally to automated devices for performing chemical analysis, and more particularly to an apparatus for feeding replaceable pipette tips to an associated pipette of a chemical analyzer, with the apparatus configured to promote efficient feeding of the pipette tips in the necessary orientation.

BACKGROUND OF THE INVENTION

Automated devices for performing chemical analysis, such as blood analyzers, ordinarily must be supplied with replaceable, liquid dispensing tips for testing samples, such as blood serum samples. Such arrangements typically include a tip carrier positioned adjacent to fluid sample containers. In order to provide the replaceable tips, the tips are manually inserted into holes defined by the carrier by the operator of the device. Indexing the carrier by the apparatus places the tips in the correct location to be picked up by the automated metering system of the apparatus.

In such arrangements, correct manual insertion of the tips by the operator is facilitated by the configuration of the holes in the carrier, and by the configuration of the pipette tips. Specifically, such tips are ordinarily of a hollow, generally conic or tapered configuration, having a relatively large end, and a relatively small end. Due to the configuration of the carrier, the tips cannot be improperly loaded by the operator, since the configuration of the tips prevents them from being inserted in an inverted or otherwise improper orientation. Each tip is thus presented in an upright orientation, with the relatively large, open end at the top thereof.

However, the proper orientation of the tips is achieved at the expense of individual handling of each tip. To minimize the handling requirements for such analyzers, it is desirable to provide an arrangement which facilitates automated operation by minimizing the required handling and feeding of such pipette tips by the operator. The present invention provides a pipette tip handling apparatus which permits a plurality of the tips to be loaded at once, rather than separately and individually, into the device for subsequent feeding to the associated analyzer apparatus.

SUMMARY OF THE INVENTION

The pipette tip feeding apparatus of the present invention permits an operator of a chemical analyzer, such as a blood analyzer, to feed a plurality of tips into the apparatus, with the apparatus subsequently automatically dispensing and feeding the tips to the analyzer. Notably, the apparatus is configured to prevent incorrect loading of the tips, thus assuring that tips are fed in the desired orientation.

An apparatus for feeding pipette tips to a pipette embodying the present invention comprises a carrier for presenting each pipette tip to an associated pipette.

The apparatus further comprises a feed magazine for receiving and storing a plurality of the pipette tips, and for loading the tips into the carrier.

The feed magazine includes an entrance port which is configured to prevent insertion of the pipette tips into the feed magazine in an incorrect orientation relative thereto, while permitting insertion of the pipette tips in a correct orientation relative thereto.

In accordance with the illustrated embodiment, the present apparatus includes a rotatable tip carrier for presenting each pipette tip to an associated pipette of a chemical analyzer or like apparatus. The present invention further includes a feed magazine arranged in operative association with the carrier for receiving and storing a plurality of pipette tips, and for gravity-feed loading of the tips into the carrier.

In accordance with the illustrated embodiment, the feed magazine includes a generally funnel-like entrance port, and a generally vertical chute portion joined to the entrance port and depending therefrom. Notably, the entrance port is configured to prevent insertion of the pipette tips in an incorrect orientation relative thereto, while permitting insertion of the tips in the desired, correct orientation. This is achieved by configuring the entrance port to define a clearance slot or opening which can receive the relatively small end portion of each pipette tip when the tip is inserted in the correct orientation. The clearance slot is sized to prevent it from receiving the opposite, relatively large end of each pipette tip in the event that a tip is inserted in the reverse, incorrect orientation. Thus, the entrance port arrangement assures the correct loading of the tips into the feed magazine, where they are arranged in a nested stack within the chute portion of the magazine.

To load the tips from the feed magazine into the associated carrier, the present apparatus includes a dispensing mechanism positioned in operative association with the lower extent of the chute portion of the feed magazine. The dispensing mechanism is configured to feed the pipette tips, one at a time, from the chute portion into the associated carrier. The dispensing mechanism includes a retractable stop for releasably retaining a lowermost one of the pipette tips in the feed magazine The dispensing mechanism further includes an indexing pawl for retracting the stop means and releasing the lowermost pipette tip from the feed magazine. In the preferred form, the indexing pawl further acts to retain the next lowermost one of the pipette tips in the feed magazine, as the lowermost tip is dispensed.

Other features and advantages of the present invention will become readily apparent from the following detailed description, the accompanying drawings, and the appended claims.

BRIEF DESCRIPTION OF THE DRAWINGS

FIG. 1 is a side-elevational, diagrammatic view illustrating a pipette tip feeding apparatus embodying the principles of the present invention; and FIGS. 2–4 are diagrammatic views illustrating a feed magazine of the tip feeding apparatus of the present invention.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

With reference now to FIG. 1, therein is illustrated the pipette tip feeding apparatus embodying the principles of the present invention. Apparatus 10 facilitates automated feeding of pipette tips, designated T, to an associated pipette of a blood analyzer or like device.

In accordance with the present invention, the apparatus 10 includes a generally elongated, feed magazine 12 positioned in operative association above a carrier 14 defining a plurality of carrier openings 16 (one being illustrated) for respectively receiving the tips T. It is contemplated that the carrier 14 be of an indexable design, whereby the pipette tips T can be positioned within respective ones of the carrier openings 16, and subsequently transferred to the pipette of the associated apparatus.

Proper feeding of the tips T to the associated apparatus requires that the tips be fed in the correct orientation to the device. Each of the tips is generally of a tapered configuration, including a relatively small lower end portion and a relatively large upper end portion. Since the open, relatively large upper end portion is fitted to the associated pipette, this end must be positioned upwardly on the carrier 14 so that the tip is presented in the proper orientation.

Correct orientation of the tips is desirably and conveniently facilitated by the configuration of the feed magazine 12. Specifically, the magazine 12 includes an upper entrance port 18 having a generally arcuate or curved, funnel-like configuration, which in turn is joined to a lower generally cylindrical chute portion 20 of the feed magazine.

Notably, the angled configuration of the entrance port 18 cooperates with the pipette tips T to assure correct orientation of the tips by preventing incorrect insertion of the tips into the feed magazine. Specifically, the entrance port 18 includes an inner curved wall portion 22, and a spaced apart, outer curved wall portion 24, which converges toward the inner wall portion. The inner and outer wall portions are joined to each other by a pair of spaced, generally parallel sidewall portions (see FIG. 3).

As illustrated in FIG. 4, the configuration of the entrance port 18 acts to preclude insertion of a tip T if the tip is in the incorrect orientation relative to the entrance port, i.e., with its relatively large end being inserted first. As shown in FIG. 4, the configuration of the inner and outer wall portions 22 and 24 acts to create interference points I preventing further insertion of the tip, and alerting the operator to the improper orientation of the tip. Additionally, it will be observed that the entrance port is configured to permit convenient removal of an incorrectly inserted tip T, in that an easily grasped portion of the pipette tip projects from the entrance port if the tip is incorrectly inserted.

To permit insertion of the tips T into the entrance port in the correct orientation, i.e., with the relatively small end portion being inserted first, the entrance port 18 of the feed magazine is configured to define a clearance arrangement for a correctly inserted tip. Specifically, the outer curved wall portion 24 defines a generally elongated clearance opening or slot 26 (see FIG. 3) which is sized to receive the relatively small end portion of each tip T during insertion of the tip in the correct orientation. The clearance slot 26 is sized so as to prevent the relatively large end portion of each tip from being received in the slot 26, thus assuring that a tip interferes with the entrance port as intended during incorrect insertion.

After the pipette tips T are inserted through the entrance port 18 into the feed magazine 12, the tips are received and stored in the generally vertically oriented chute portion 20 of the magazine. As illustrated, the generally cylindrical chute portion is sized to maintain the pipette tips T in their upright configuration, while permitting gravity feed of the tips to the associated carrier 14. Of course, the chute portion 20 can be sized to any desired length for receiving and storing the desired number of pipette tips T.

To provide automated dispensing of each tip T into a respective one of the carrier openings 16, apparatus 10 includes a dispensing mechanism. In accordance with the illustrated embodiment, the dispensing mechanism includes a spring-loaded stop element 28 positioned generally at the lower extent of the chute portion 20 of the feed magazine, with the stop element 28 projecting into or beneath the chute portion so as to retain the lowermost pipette tip T in the chute portion. The stop element 28 prevents the tips in the feed magazine from falling onto the carrier 14, and prevents the tips from being forced from the magazine in the event that the operator inadvertently attempts to load an excessive number of the pipette tips.

To withdraw the stop element 28 in opposition to its biasing spring, thus permitting dispensing of the lowermost pipette tip T, the dispensing mechanism further includes an indexing pawl 30 mounted for reciprocable vertical movement under the action of a dispensing solenoid 32, or like driving device, operatively connected thereto.

The indexing pawl 30 is preferably configured to provide a plurality of functions attendant to downward stroking of the pawl by the dispensing solenoid. By virtue of the illustrated cooperating cam surfaces on the stop element 28 and the indexing pawl 30, downward movement of the pawl relative to the stop element urges the stop element in opposition to its biasing spring, thereby releasing the lowermost one of the pipette tips T from the stack within the chute portion 20. To assure the desired separation of the lowermost tip T from the next lowermost pipette tip, the indexing pawl 30 preferably defines an upper engagement portion 34, configured to extend through a suitable slot or the like in the chute portion 20, for engagement with the upper relatively large end portion of the lowermost pipette tip. Thus, the downward stroking of the indexing pawl acts to displace the stop element 28 to permit release of the lowermost pipette tip, with the indexing pawl further preferably functioning to pull and dispense the lowermost pipette tip from the stack within the chute portion of the feed magazine.

In conjunction with dispensing of the lowermost pipette tip, it is desired that the remaining pipette tips in the feed magazine remain in position until the stop element 28 is returned to its position for releasably retaining the lowermost pipette tip. Accordingly, the upper end engagement portion 34 of the indexing pawl 30 preferably further functions to engage and retain the next lowermost one of the pipette tips T as the lowermost tip is dispensed.

Upon upward stroking of the indexing pawl by the solenoid 32, the stop element 28 is returned to its position whereby it projects into the chute portion 20 to releasably retain the lowermost pipette tip in the feed magazine. At the same time, the upper end portion of the indexing pawl releases the stack of pipette tips, thereby permitting the stack to fall within the feed magazine until the stack is again retained by the stop element 28.

A suitable cam surface or like arrangement can be provided (such as on the chute portion 20 for cooperation with the upper engagement portion 34 of the pawl 30) so that the reciprocable movement of the pawl 30 by solenoid 32 moves the engagement portion 34 inwardly and outwardly, relative to the chute portion 20, for effecting the desired retention and indexing of the pipette tips T.

From the foregoing, it will be observed that numerous modifications and variations can be effected without departing from the true spirit and scope of the novel concept of the present invention. It is to be understood that no limitation with respect to the present disclosure is intended or should be inferred. The disclosure is intended to cover by the appended claims all such modifications as fall within the scope of the claims.

What is claimed is:

1. An apparatus for feeding pipette tips to a pipette, comprising:
   a carrier for presenting each said pipette tip to an associated pipette; and
   feed magazine means for receiving and storing a plurality of said pipette tips, and means for loading said tips into said carrier included on the means for receiving and storing said feed magazine including entrance port means for preventing insertion of said pipette tips into said feed magazine means in an incorrect orientation relative thereto, while permitting insertion of said pipette tips in a correct orientation relative thereto.

2. An apparatus for feeding pipette tips in accordance with claim 1, wherein
   said entrance port means includes clearance means for receiving a relatively small end portion of each said pipette tip during insertion in said correct orientation, said clearance means being sized to prevent said clearance means from receiving an opposite, relatively large end portion of each said pipette tip in said incorrect orientation.

3. An apparatus for feeding pipette tips in accordance with claim 2, wherein
   said entrance port means comprises spaced apart, curved inner and outer wall portions, said clearance means being defined by said outer wall portion.

4. An apparatus for feeding pipette tips in accordance with claim 3, wherein
   said clearance means comprises a generally elongated clearance slot defined by said outer wall portion of said entrance port means.

5. An apparatus for feeding pipette tips in accordance with claim 1, wherein
   said feed magazine means includes a generally vertically oriented chute portion joined to said entrance port means for storing a plurality of pipette tips for gravity feed to said carrier,
   said means for landing including means for dispensing said pipette tips, one at a time, from the chute portion of said magazine means into said carrier.

6. An apparatus for feeding pipette tips in accordance with claim 5, wherein
   said dispensing means comprises retractable stop means for releasably retaining a lowermost one of said pipette tips in said feed magazine means, and indexing pawl means for retracting said stop means and releasing said lowermost pipette tip, and for retaining a next lowermost one of said pipette tips in said feed magazine means.

7. An apparatus for feeding pipette tips to a pipette, comprising:
   feed magazine means for receiving and storing a plurality of said pipette tips, said feed magazine means including entrance port means for preventing insertion of said pipette tips into said feed magazine means in an incorrect orientation relative thereto, while permitting insertion of said pipette tips in a correct orientation relative thereto,
   said entrance port means comprising spaced apart, relatively converging, curved inner and outer wall portions, said outer wall portion including clearance means for receiving a relatively small end portion of each said pipette tip during insertion in said correct orientation, said clearance means being sized to prevent said clearance means from receiving an opposite, relatively large end portion of each said pipette tip in said incorrect orientation,
   said feed magazine means including a generally vertically oriented chute portion joined to said entrance port means for storing a plurality of pipette tips for gravity feed through the lower end of said chute portion.

8. An apparatus for feeding pipette tips in accordance with claim 7, including
   dispensing means for dispensing said pipette tips, one at a time, from the chute portion of said feed magazine means.

9. An apparatus for feeding pipette tips in accordance with claim 8, including
   a carrier for receiving said pipette tips from said feed magazine means, and for presenting each pipette tip to an associated pipette.

* * * * *